(12) United States Patent
Ise et al.

(10) Patent No.: US 6,508,891 B2
(45) Date of Patent: Jan. 21, 2003

(54) METHOD OF MANUFACTURING HYDROGEN-ABSORBING ALLOY ELECTRODE

(75) Inventors: Tadashi Ise, Itano-gun (JP); Tetsuyuki Murata, Naruto (JP); Yohei Hirota, Itano-gun (JP); Teruhiko Imoto, Itano-gun (JP); Koji Miki, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 25 days.

(21) Appl. No.: 09/776,894

(22) Filed: Feb. 6, 2001

(65) Prior Publication Data

US 2001/0020499 A1 Sep. 13, 2001

(30) Foreign Application Priority Data

Feb. 15, 2000 (JP) .................................... 2000-036363

(51) Int. Cl.$^7$ .............................................. C23C 22/00
(52) U.S. Cl. .................. 148/243; 148/272; 148/281; 148/513; 427/216; 134/28; 134/29; 134/41
(58) Field of Search ................... 148/243, 272, 148/281, 513; 427/216; 134/28, 29, 41

(56) References Cited

U.S. PATENT DOCUMENTS 5,932,034 A * 8/1999 Ishii et al. .................. 148/121
5,943,545 A * 8/1999 Ise .............................. 148/513

FOREIGN PATENT DOCUMENTS

JP         3-152868         6/1991

\* cited by examiner

*Primary Examiner*—John Sheehan
*Assistant Examiner*—Andrew L. Oltmans
(74) *Attorney, Agent, or Firm*—Nixon & Vanderhye P.C.

(57) ABSTRACT

The method of manufacturing a hydrogen-absorbing alloy electrode according to this invention comprises the steps of: dissolving a particle surface of said hydrogen-absorbing alloy by a surface-treatment solution; and washing the hydrogen-absorbing alloy with the particle surface dissolved using an alkaline solution at a temperature of 30° C.~40° C. The metal ions dissolved by the surface-treatment solution can be completely washed away by the alkaline solution so that they will not be precipitated onto the surface of the hydrogen-absorbing alloy again as the hydroxide.

19 Claims, No Drawings

METHOD OF MANUFACTURING HYDROGEN-ABSORBING ALLOY ELECTRODE

BACKGROUND OF THE INVENTION

1. Field of the Invention

This invention relates to a hydrogen-absorbing alloy electrode capable of reversibly carrying out the electrochemical charge/discharge of hydrogen which is used as a negative electrode of a nickel-metal hydride battery, and more particularly to surface-treatment for activating the particle surface of the hydrogen-absorbing alloy.

2. Description of the Related Art

Traditionally, an alkaline battery has been employed as various kinds of power sources. A small-sized battery thereof has been used for various kinds of portable electronic/communicating appliances and a large-sized battery thereof has been used for an application of industry. In such a kind of alkaline battery, in most cases, a positive electrode is made of nickel compound. On the other hand, a negative electrode has been made of zinc, iron, hydrogen compound instead of cadmium compound, but mainly made of cadmium compound.

In recent years, in order to realize the alkaline battery with high energy density, the nickel-metal hydride battery containing a hydrogen-absorbing alloy electrode has attracted attention and has been put into practice. It has been known hydrogen-absorbing alloys using Ti—Ni alloy, La (or Mm)—Ni alloy, etc.

The hydrogen-absorbing alloy used in the hydrogen-absorbing alloy electrode is a ground alloy which is obtained by grinding an alloy ingot, flake or spherical particle mechanically, or particle of a spherical or similar shape (elliptical) particle which is made by an atomization, a rotary disk method, a rotary nozzle method, etc.

Meanwhile, the surface of the hydrogen-absorbing alloy particle is very active. Therefore, when it exposed to air just a little, it immediately reacts with oxygen in the air. As a result, the alloy surface is oxidized to form an oxide layer. The oxide layer deteriorates the surface activity of the alloy, and particularly causes to reduction of the initial discharging capacity of the battery. Therefore, after the battery has been assembled, it must be subjected to charging/discharging in several cycles to several tens cycles to remove the oxide layer and activate the particle surface, thereby realizing the desired discharging capacity. This requires a large amount of labor and time.

In order to overcome such difficulty, it was proposed in JP-A-3-152868 that after the hydrogen-absorbing alloy particle has been treated by an acid solution, it is treated by an alkaline solution. In the technique of treatment proposed in JP-A-3-152868, since the hydrogen-absorbing alloy particle is treated by the alkaline solution after the acid treatment, its surface is covered with a porous layer mainly containing hydroxide. For this reason, even when the hydrogen-absorbing alloy is thereafter exposed to air, it will not be covered with a dense oxide layer so that the electrochemical activity of the surface will not be reduced.

However, in the method of treatment proposed in JP-A-3-152868, since the hydrogen-absorbing alloy particle is treated by the alkaline solution at room temperature after the acid treatment, metal ions dissolved in the alkaline solution cannot be sufficiently removed. The dissolved metal ions may be precipitated on the surface of the hydrogen-absorbing alloy again as hydroxide. This led to the problem of deterioration of the high rate discharging characteristic and low temperature discharging characteristic.

SUMMARY OF THE INVENTION

This invention has been accomplished in order to solve the above problem, and an object of this invention is to prevent precipitation of metal ions dissolved in a surface treatment solution to provide a hydrogen-absorbing alloy electrode which is excellent in the high rate discharging characteristic and low temperature discharging characteristic.

In order to attain the above object, a method of manufacturing a hydrogen-absorbing alloy electrode according to this invention comprises the steps of:

dissolving a particle surface of said hydrogen-absorbing alloy by a surface-treatment solution; and washing the hydrogen-absorbing alloy with the particle surface dissolved in an alkaline solution at a temperature not more than 40° C., preferably at a temperature of 30° C.~40° C.

In this way, if the particle surface of said hydrogen-absorbing alloy, after having been dissolved by a surface-treatment solution is washed using an alkaline solution at a temperature of 30° C.~40° C., the metal ions dissolved by the surface-treatment solution can be completely washed away by the alkaline solution. Thus, the metal ions will not be precipitated onto the surface of the hydrogen-absorbing alloy again as a hydroxide. Particularly, in a nickel-metal hydride battery in which the alkaline solution is used as an electrolyte, washing by the alkaline solution prevents the metal ions from being dissolved within the battery. This improves the high rate discharging characteristic and the low temperature discharging characteristic of the hydrogen-absorbing alloy electrode.

Incidentally, the washing using the alkaline solution of which the temperature exceeds 40° C. precipitates an alloy component as well as the hydroxide. Therefore, the temperature of the alkaline solution used must be controlled at 40° C. or lower. On the other hand, if the temperature of the alkaline solution is lower than 30° C., the washing effect cannot be sufficiently shown, therefore its temperature must be controlled at 30° C. or higher.

The method of manufacturing a hydrogen-absorbing alloy electrode according to this invention comprises:

dissolving a particle surface of said hydrogen-absorbing alloy by a surface-treatment solution; and water-rinsing the hydrogen-absorbing alloy with the particle surface dissolved; and washing the hydrogen-absorbing alloy thus water-rinsed in an alkaline solution at a temperature of 40° C. or lower.

Most of the components solved by the surface-treatment solution are precipitated as hydroxides in an alkaline region. Therefore, if a hydrogen-absorbing alloy is treated with the alkaline solution, the hydroxide may be precipitated owing to changes in pH, therefore the washing effect cannot be shown sufficiently. In order to obviate such inconvenience, the hydrogen-absorbing alloy is water-rinsed after its surface is dissolved by the surface-treatment solution so that the dissolved element can be removed. Thus, the effect of the subsequent washing using the alkaline solution can be shown sufficiently. In this case, since the dissolved element has been already washed way, the temperature of the alkaline solution may be lower than 30° C. as long as it is 40° C. or lower.

The method of manufacturing a hydrogen-absorbing alloy electrode according to this invention comprises the steps of:

dissolving a particle surface of said hydrogen-absorbing alloy by a surface-treatment solution; and treating the hydrogen-absorbing alloy with the particle surface dissolved using an acid solution of pH 4 or lower; and washing the hydrogen-absorbing alloy thus treated using an alkaline solution at a temperature of 40° C. or lower.

Most of the elements dissolved by the surface-treatment solution are precipitated as hydroxide in an alkaline region. Therefore, if the hydrogen-absorbing alloy is initially treated by a weak acid solution of pH 4 or lower, the hydroxide is not almost precipitated. This permits the washing to be carried out is a state where precipitation of the metal hydroxide has been suppressed. For this reason, the effect of the subsequent washing using the alkaline solution can be shown sufficiently. In this case also, since the dissolved elements have been already washed way, the temperature of the alkaline solution may be lower than 30° C. as long as it is 40° C. or lower.

Since treatment of the surface of the hydrogen-absorbing alloy by the surface-treatment solution intends to show the effects of increasing the surface area of the hydrogen-absorbing alloy and converting the surface of the hydrogen-absorbing alloy into a transient metal enriched layer, the surface-treatment solution is preferably an alkaline solution at a temperature of 60° C. or higher, or an acid solution of pH3 or lower.

DESCRIPTION OF THE PREFERRED EMBODIMENTS

An explanation will be given of an embodiment of this invention in which the hydrogen-absorbing alloy electrode according to this invention is applied to a nickel-metal hydride battery.

1. Creation of Hydrogen-Absorbing Alloy Particle

The elements of Mm (mishmetal), Ni (purity of 99.9%), Co, Al and Mn are mixed at a molar ratio of 1.0: 3.6: 0.6: 0.3: 0.5. Thereafter, these elements were melted in a high frequency melting furnace, and cooled on a water-cooled copper roll to prepare an ingot of a hydrogen-absorbing alloy having a composition represented by a composition formulas of $MmNi_{3.6}Co_{0.6}Al_{0.3}Mn_{0.6}$. After the ingot of this hydrogen-absorbing alloy has been heat-treated, it was put into a ball mill so that it was ground to provide the ground alloy particle having a mean diameter of 60 $\mu$m. The mean diameter of the ground alloy particle is preferably in a range between 20 to 100 $\mu$m. As an hydrogen-absorbing alloy, a rare earth-nickel type alloy or another alloy can be used.

2. Surface-Treatment of the Hydrogen-Absorbing Alloy Particle (1) Embodiment 1

The particle of the hydrogen-absorbing alloy of 1 kg thus obtained was added to a hydrochloric acid (HCl) solution of pH 1, and mixed/stirred so that it was subjected to surface-treatment (dissolving treatment). Thereafter, the hydrochloric acid solution was drained. The alloy particle thus treated was washed in a potassium hydroxide (KOH) solution of 30 mass % at 40° C. to prepare the surface-treated hydrogen-absorbing alloy particle a according to the first embodiment.

(2) Embodiment 2

Likewise, the particle of the hydrogen-absorbing alloy of 1 kg thus obtained was added to a hydrochloric acid solution of pH 1, and mixed/stirred so that it was subjected to surface-treatment (dissolving treatment) for about 10 minutes. Thereafter, the hydrochloric acid solution was drained. The alloy particle thus treated was sufficiently rinsed in ion-exchange water and thereafter washed in a potassium hydroxide (KOH) solution of 30 mass % at 40° C. to preparate the surface-treated hydrogen-absorbing alloy particle b according to the second embodiment.

(3) Embodiment 3

Likewise, the particle of the hydrogen-absorbing alloy of 1 kg thus obtained was added to a potassium hydroxide solution of 30 mass % at 100° C. and mixed/stirred so that it was subjected to surface-treatment (dissolving treatment) for about 10 minutes. Thereafter, the potassium hydroxide solution was drained. The alloy particle thus treated was washed in a potassium hydroxide (KOH) solution of 30 mass % at 40° C. to prepare the surface-treated hydrogen-absorbing alloy particle c according to the third embodiment.

(4) Embodiment 4

Likewise, the particle of the hydrogen-absorbing alloy of 1 kg thus obtained was added to a potassium hydroxide solution of 30 mass % at 100° C. and mixed/stirred so that it was subjected to surface-treatment (dissolving treatment) for about 10 minutes. Thereafter, the potassium hydroxide solution was drained. The alloy particle thus treated was sufficiently rinsed in ion-exchange water and thereafter washed in a potassium hydroxide (KOH) solution of 30 mass % at 40° C. to prepare the surface-treated hydrogen-absorbing alloy particle d according to the fourth embodiment.

(5) Embodiment 5

Likewise, the particle of the hydrogen-absorbing alloy of 1 kg thus obtained was added to a hydrochloric acid solution of pH 1, and mixed/stirred so that it was subjected to surface-treatment (dissolving treatment) for about 10 minutes. Thereafter, the hydrochloric acid solution was drained. The alloy particle thus treated was an acetic acid ($CH_3COOH$) solution of pH 4 and thereafter washed in a potassium hydroxide (KOH) solution of 30 mass % at 40° C. to prepare the surface-treated hydrogen-absorbing alloy particle e according to the fifth embodiment.

(6) Embodiment 6

Likewise, the particle of the hydrogen-absorbing alloy of 1 kg thus obtained was added to a potassium hydroxide solution of 30 mass % at 100° C., and mixed/stirred so that it was subjected to surface-treatment (dissolving treatment) for about 10 minutes. Thereafter, the potassium hydroxide solution was drained. The alloy particle thus treated was an acetic acid ($CH_3COOH$) solution of pH 4 and thereafter washed in a potassium hydroxide (KOH) solution of 30 mass % at 40° C. to prepare the surface-treated hydrogen-absorbing alloy particle f according to the sixth embodiment.

(7) Embodiment 7

Likewise, the particle of the hydrogen-absorbing alloy of 1 kg thus obtained was added to a hydrochloric acid solution of pH 1, and mixed/stirred so that it was subjected to surface-treatment (dissolving treatment) for about 10 minutes and mixed/stirred so that it was subjected to surface-treatment (dissolving treatment) for about 10 minutes. Thereafter, the hydrochloric acid solution was drained. The alloy particle thus treated was washed in a potassium hydroxide (KOH) solution of 30 mass % at 30° C. to prepare the surface-treated hydrogen-absorbing alloy particle g according to the seventh embodiment.

(8) Embodiment 8

Likewise, the particle of the hydrogen-absorbing alloy of 1 kg thus obtained was added to a hydrochloric acid solution of pH 1, and mixed/stirred so that it was subjected to surface-treatment (dissolving treatment) for about 10 minutes and mixed/stirred so that it was subjected to surface-treatment (dissolving treatment) for about 10 minutes. Thereafter, the hydrochloric acid solution was drained. The alloy particle thus treated was sufficiently rinsed in ion-exchange water and thereafter washed in a potassium hydroxide (KOH) solution of 30 mass % at 25° C. to prepare the surface-treated hydrogen-absorbing alloy particle h according to the eighth embodiment.

(9) Embodiment 9

Likewise, the particle of the hydrogen-absorbing alloy of 1 kg thus obtained was added to a hydrochloric acid solution of pH 1, and mixed/stirred so that it was subjected to surface-treatment (dissolving treatment) for about 10 minutes and mixed/stirred so that it was subjected to surface-treatment (dissolving treatment) for about 10 minutes. Thereafter, the hydrochloric acid solution was drained. The alloy particle thus treated was sufficiently rinsed in ion-exchange water and thereafter washed in a potassium hydroxide (KOH) solution of 30 mass % at 30° C. to prepare the surface-treated hydrogen-absorbing alloy particle i according to the ninth embodiment.

(10) Comparative Example 1

Next, the particle of the hydrogen-absorbing alloy of 1 kg thus obtained was added to a hydrochloric acid solution of pH 1, and mixed/stirred so that it was subjected to surface-treatment (dissolving treatment) for about 10 minutes and mixed/stirred so that it was subjected to surface-treatment (dissolving treatment) for about 10 minutes. Thereafter, the hydrochloric acid solution was drained. The alloy particle thus treated was sufficiently rinsed in ion-exchange water to prepare the surface-treated hydrogen-absorbing alloy particle x according to the first comparative example.

(11) Comparative Example 2

Likewise, the particle of the hydrogen-absorbing alloy of 1 kg thus obtained was added to a potassium hydroxide solution of 30 mass % at 100° C. and mixed/stirred so that it was subjected to surface-treatment (dissolving treatment) for about 10 minutes. Thereafter, the potassium hydroxide solution was drained. The alloy particle thus treated was sufficiently rinsed in ion-exchange water to prepare the surface-treated hydrogen-absorbing alloy particle according to the second comparative example.

(12) Comparative Example 3

Likewise, the particle of the hydrogen-absorbing alloy of 1 kg thus obtained was added to a hydrochloric acid solution of pH 1, and mixed/stirred so that it was subjected to surface-treatment (dissolving treatment) for about 10 minutes and mixed/stirred so that it was subjected to surface-treatment (dissolving treatment) for about 10 minutes. Thereafter, the hydrochloric acid solution was drained. The alloy particle thus treated was washed in a potassium hydroxide (KOH) solution of 30 mass % at 25° C. to prepare the surface-treated hydrogen-absorbing alloy particle z according to the third comparative example.

3. Creation of a Hydrogen-Absorbing Alloy Electrode

Next, using these hydrogen-absorbing alloy particles a to i according to the first to ninth embodiments and these hydrogen-absorbing alloy particles x, y and z according to the first to third comparative examples, 100 mass fraction of the hydrogen-absorbing alloy power and 20 mass part of a poly(ehelene oxide) (PEO) solution of 1 mass % serving as a binder are mixed to prepare slurry. The slurry was coated to both surfaces of a collector made of conductor of punching metal sheet plated with nickel and dried at room temperature. Thereafter, it was cut in a prescribed size to manufacture hydrogen-absorbing alloy electrodes A to I and X to Z.

In this case, the hydrogen-absorbing alloy electrode A was manufactured using the hydrogen-absorbing alloy particle a. Likewise, the hydrogen-absorbing alloy electrodes B, C, D, E, F, G, H and I were manufactured using hydrogen-absorbing alloy particles b, c, d, e, f, g, h and i. The hydrogen-absorbing alloy electrodes X, Y and Z were manufactured using the hydrogen-absorbing alloy particles x, y and z.

4. Creation of a Nickel-Hydrogen Battery

A negative electrode of each of these hydrogen-absorbing alloy electrodes A to I and X to Z and a positive electrode of a non-sintered nickel hydroxide electrode with a separator put therebetween were wound spirally to manufacture a combination of electrodes. The combination of electrodes were inserted in an outer case. A negative lead which extends from the negative electrode is welded to the inside bottom of the outer case and the positive lead which extends from the positive electrode thereof are welded to a sealing cap. Thereafter, the sealing cap is mounted in the outer case and sealed. Thus, nickel-metal hydride batteries each having an AA size and a theoretical capacity of 1000 mAh were manufactured.

5. Activation of the Nickel-Metal Hydride Battery

Each nickel-metal hydride battery was subjected to three charging/discharging cycles in each of which the charging is continued for 16 hours with a charging current of 100 mA at room temperature (25° C.), and rested for 1 hour, and the discharging is continued with a discharging current of 200 mA (0.2 C) until the discharging end voltage reaches 1.0 V and sealing cap for 1 hour. Thus, each nickel-metal hydride battery was activated.

6. Test for a Low Temperature Discharging Characteristic

The nickel-metal hydride battery thus activated is charged for 16 hours with a charging current of 100 mA (0.1 C) at room temperature (25° C.) and thereafter given a rest at −10° C. for 1 hour, and discharged with a discharging current of 1000 mA (1C) at −10° C. until the voltage reaches 1.0 V. In this state, on the basis of the discharging hour, the discharging capacity at a low temperature (−10° C.) was measured from the discharging time. Further, the ratio of the discharging capacity at the low temperature (−10° C. to that at room temperature (25° C.) was measured. The result for each battery is shown in Table 1.

TABLE 1

| Kind of Electrode | Alloy Particle | Surface-treatment (solvent) | Rinsing (ion-exchange water, or $CH_3COOH$) | Washing | Low-Temperature Characteristic (%) |
|---|---|---|---|---|---|
| A | a | HCl (pH1) | none | 40° C., 30% KOH | 90 |
| B | b | HCl (pH1) | Ion-exchange water | 40° C., 30% KOH | 93 |
| C | c | 100° C., 30% KOH | none | 40° C., 30% KOH | 85 |
| D | d | 100° C., 30% KOH | Ion-exchange water | 40° C., 30% KOH | 90 |
| E | e | HCl (pH1) | $CH_3COOH$ (pH4) | 40° C., 30% KOH | 95 |
| F | f | 100° C., 30% KOH | $CH_3COOH$ (pH4) | 40° C., 30% KOH | 93 |
| G | g | HCl (pH1) | none | 30° C., 30% KOH | 87 |
| H | h | HCl (pH1) | Ion-exchange water | 25° C., 30% KOH | 87 |

TABLE 1-continued

| Kind of Electrode | Alloy Particle | Surface-treatment (solvent) | Rinsing (ion-exchange water, or CH$_3$COOH) | Washing | Low-Temperature Characteristic (%) |
|---|---|---|---|---|---|
| I | I | HCl (pH1) | Ion-exchange water | 30° C., 30% KOH | 90 |
| X | x | HCl (pH1) | Ion-exchange water | none | 80 |
| Y | y | 100° C., 30% KOH | Ion-exchange water | none | 70 |
| Z | z | HCl (pH1) | none | 25° C., 30% KOH | 82 |

It can be seen from Table 1 that if the hydrogen-absorbing alloy particle is not washed in the alkaline solution after the acid treatment using the hydrochloric acid solution of pH 1 (hydrogen-absorbing alloy particle x according to the comparative example 1) or after the hot alkaline treatment using the potassium hydroxide (KOH) of 30 mass % at 100° C. (hydrogen-absorbing alloy particle according to the comparative example 2), its low temperature characteristic is not improved. It is thought that the metal ions dissolved into the hydrochloric acid and hot alkali are precipitated on the surface of the hydrogen-absorbing alloy as hydroxide, as a result the metal ions are dissolved into the nickel-metal hydride battery.

Further, it can be seen that even if the hydrogen-absorbing alloy particle is washed in the potassium hydroxide (KOH) solution of 30 mass % at 25° C. after the acid treatment using the hydrochloric acid solution of pH 1 (hydrogen-absorbing alloy particle z according to the comparative example 3), its low temperature characteristic is not improved. It is thought that the washing using the alkaline solution at not higher than 30° C. cannot show its washing effect sufficiently. For this reason, the temperature of the alkaline solution used for washing must be 30° C. or higher.

On the other hand, it can be seen that as regards the electrode A using the hydrogen-absorbing alloy particle a according to the first embodiment (which is washed washing in the potassium hydroxide (KOH) solution of 30 mass % at 40° C. after the acid treatment using hydrochloric acid of pH 1), electrode C using the hydrogen-absorbing alloy particle c according to the third embodiment (which is washed in the potassium hydroxide (KOH) solution of 30 mass % at 40° C. after the hot alkaline treatment using the potassium hydroxide (KOH) solution of 30 mass % at 100° C.), and electrode G using the hydrogen-absorbing alloy particle a according to the seventh embodiment (which is washed in the potassium hydroxide (KOH) solution of 30 mass % at 30° C. after the acid treatment using hydrochloric acid of pH 1, their low temperature characteristics have been improved, respectively.

This is probably because if the hydrogen-absorbing alloy is washed in the alkaline solution at 30° C. (inclusive)-40° C. (inclusive) after its particle surface has been dissolved in the hydrochloric acid or hot alkali, the metal ions dissolved in the hydrochloric acid or hot alkali can be washed away by the alkaline solution so that the dissolved metal ions are not precipitated on the surface of the hydrogen-absorbing alloy as hydroxide. In addition, since the alkaline solution is used as an electrolyte of the nickel-metal hydride battery, the washing using alkaline solution prevents the metal ions from being dissolved also within the battery so that the high rate and low temperature discharging characteristic have been improved.

In this case, if the temperature of the alkaline solution for washing exceeds 40° C., the alloy elements as well as the hydroxide are solved. For this reason, the temperature of the alkaline solution must be 40° C. or lower. If the temperature of the alkaline solution for washing is lower that 30° C., the washing effect cannot be shown sufficiently. For this reason, the temperature of the alkaline solution must be 30° C. or higher.

Further, it can be seen that as regard the electrode B using the hydrogen-absorbing alloy particle b according to the second embodiment (which is rinsed in ion-exchange water and washed in the potassium hydroxide (KOH) solution of 30 mass % at 40° C. after the acid treatment using the hydrochloric acid of pH 1), electrode D using the hydrogen-absorbing alloy particle d according to the fourth embodiment (which is rinsed in ion-exchange water and washed in the potassium hydroxide (KOH) solution of 30 mass % at 40° C. after the hot alkaline treatment using the potassium hydroxide (KOH) solution of 30 mass % at 100° C.) and electrode I using the hydrogen-absorbing alloy particle i according to the ninth embodiment (which is rinsed in ion-exchange water and washed in the potassium hydroxide (KOH) solution of 30 mass % at 30° C. after the acid treatment using the hydrochloric acid of pH 1), their low temperature characteristics have been further improved, respectively.

The reason is as follows. Most of the elements solved in the hydrochloric acid or hot alkali is in the region where hydroxide is precipitated in an alkaline region. Therefore, if a hydrogen-absorbing alloy is initially washed by using the alkaline solution, the hydroxide may be precipitated owing to changes in pH.

However, if the particle surface of the hydrogen-absorbing alloy is rinsed in ion-exchange water after it is dissolved by the hydrochloric acid or hot alkali, the dissolved elements can be removed. Thus, the effect of the subsequent washing using the alkaline solution can be shown sufficiently.

Further, it can be seen that as regards the electrode E using the hydrogen-absorbing alloy particle e according to the fifth embodiment (which is rinsed in acetic acid of pH 4 and washed in the potassium hydroxide (KOH) solution of 30 mass % at 40° C. after the acid treatment using the hydrochloric acid of pH 1) and electrode F using the hydrogen-absorbing alloy particle f according to the sixth embodiment (which is rinsed in acetic acid of pH 4 and washed in the potassium hydroxide (KOH) solution of 30 mass % at 40° C. after the hot alkaline treatment using the potassium hydroxide (KOH) solution of 30 mass % at 100° C.), their low temperature characteristics have been further improved, respectively.

The reason is as follows. Most of the elements dissolved in the hydrochloric acid or hot alkali is precipitated in an alkaline region. Therefore, if it is initially treated by the a weak acid solution (acetic acid) of pH 4 or lower, the hydroxide is not almost generated so that the washing using the alkaline solution can be carried out with precipitation of the remaining metal ions being suppressed. Thus, the washing effect of the subsequent washing using the alkaline solution can be shown sufficiently.

Further, it can be seen that as regard the electrode I using the hydrogen-absorbing alloy particle i according to the ninth embodiment (which is rinsed in ion-exchange water and washed in the potassium hydroxide (KOH) solution of 30 mass % at 30° C. after the acidic treatment using the hydrochloric acid of pH 1), and electrode H using the hydrogen-absorbing alloy particle h according to the eighth embodiment (which is rinsed in ion-exchange water and washed in the potassium hydroxide (KOH) solution of 30 mass % at 25° C. after the acidic treatment using the hydrochloric acid of pH 1), their low temperature characteristics did not differ so greatly.

If the particle surface of the hydrogen-absorbing alloy is rinsed in ion-exchange water after it has been dissolved by the hydrochloric acid (or hot alkali), the elements solved owing to dissolving by the hydrochloric acid (or hot alkali) are removed. Therefore, the above fact means that the temperature of the alkaline solution may be lower than 30° C. as long as it is not higher than 40° C.

As understood from the description hitherto made, the particle surface of said hydrogen-absorbing alloy, after having been dissolved by the hydrochloric acid or hot alkali, is washed in an alkaline solution at a temperature of 30° C.~40° C. Therefore, the metal ions dissolved by the hydrochloric acid or hot alkali can be completely washed away by the alkaline solution. Thus, the metal ions will not be d onto the surface of the hydrogen-absorbing alloy again as the hydroxide. In a nickel-hydrogen battery in which the alkaline solution is used as an electrolyte, washing by the alkaline solution prevents the metal ions from being dissolved within the battery. This improves the high rate discharging charging and the low temperature discharging characteristic of the hydrogen-absorbing alloy electrode.

Additionally, in accordance with this invention, the particle surface of said hydrogen-absorbing alloy, after having been dissolved by the hydrochloric acid or hot alkali, is rinsed in ion-exchange water or treated by weak acid of acetic acid of pH 4 or lower before the washing using the alkaline solution. In this case, the element solved owing to dissolving by the hydrochloric acid (or hot alkali) is removed. Therefore, the effect of the subsequent washing using the alkaline solution can be shown sufficiently. In this case, the temperature of the alkaline solution may be lower than 30° C. as long as it is 40° C. or lower.

Another method of fabricating an electrode can be used, for example, the above described slurry can be applied (impregnated) into a formed metal plate and then dried and extended by pressure.

What is claimed is:

1. A method of manufacturing a hydrogen-absorbing alloy electrode containing a hydrogen-absorbing alloy capable of reversibly carrying out electrochemical charge/discharge of hydrogen, comprising the steps of:

dissolving a particle surface of said hydrogen-absorbing alloy with a surface-treatment solution; and washing the hydrogen-absorbing alloy with the particle surface dissolved with an alkaline solution at a temperature of 30° C. to 40° C.

2. A method of manufacturing a hydrogen-absorbing alloy electrode containing a hydrogen-absorbing alloy capable of reversibly carrying out electrochemical charge/discharge of hydrogen, according to claim 1, further comprising the step of:

water-rinsing the hydrogen-absorbing alloy with the particle surface dissolved by said surface treatment solution, before said washing step.

3. A method of manufacturing a hydrogen-absorbing alloy electrode containing a hydrogen-absorbing alloy capable of reversibly carrying out electrochemical charge/discharge of hydrogen, according to claim 1, further comprising the steps of:

treating the hydrogen-absorbing alloy with the particle surface dissolved with said surface-treatment solution, by an acid solution of pH 4 or lower, before said washing step.

4. A method of manufacturing a hydrogen-absorbing alloy electrode according to claim 1, wherein said surface-treatment solution is an alkaline solution at a temperature of 60° C. or higher.

5. A method of manufacturing a hydrogen-absorbing alloy electrode according to claim 1, wherein said surface-treatment solution is an acid solution of pH3 or lower.

6. A method of manufacturing a hydrogen-absorbing alloy electrode according to claim 1, further comprising the steps of:

preparing a slurry by mixing the hydrogen-absorbing alloy obtained in said washing step and binder; and coating said slurry onto a collector.

7. A method of manufacturing a hydrogen-absorbing alloy electrode according to claim 1, wherein said hydrogen-absorbing alloy is a rare earth-nickel alloy.

8. A method of manufacturing a hydrogen-absorbing alloy electrode according to claim 1, wherein said alkaline solution is made of potassium hydroxide (KOH).

9. A method of manufacturing a hydrogen-absorbing alloy electrode according to claim 2, wherein said surface-treatment solution is an alkaline solution at a temperature of 60° C. or higher.

10. A method of manufacturing a hydrogen-absorbing alloy electrode according to claim 2, wherein said surface-treatment solution is an acid solution of pH 3 or lower.

11. A method of manufacturing a hydrogen-absorbing alloy electrode according to claim 2, further comprising the steps of:

preparing a slurry by mixing the hydrogen-absorbing alloy obtained in said washing step and binder; and coating said slurry onto the collector.

12. A method of manufacturing a hydrogen-absorbing alloy electrode according to claim 2, wherein said hydrogen-absorbing alloy is a rare earth-nickel alloy.

13. A method of manufacturing a hydrogen-absorbing alloy electrode according to claim 2, wherein said alkaline solution is made of potassium hydroxide (KOH).

14. A method of manufacturing a hydrogen-absorbing alloy electrode according to claim 3, wherein said surface-treatment solution is an alkaline solution at a temperature of 60° C. or higher.

15. A method of manufacturing a hydrogen-absorbing alloy electrode according to claim 2, wherein said surface-treatment solution is an acid solution of pH3 or lower.

16. A method of manufacturing a hydrogen-absorbing alloy electrode according to claim 3, further comprising the steps of:

preparing a slurry by mixing the hydrogen-absorbing alloy obtained in said washing step and binder; and coating said slurry onto the collector.

17. A method of manufacturing a hydrogen-absorbing alloy electrode according to claim 3, wherein said hydrogen-absorbing alloy is rare earth-nickel alloy.

18. A method of manufacturing a hydrogen-absorbing alloy electrode according to claim 3, wherein said alkaline solution is made of potassium hydroxide (KOH).

19. A method of manufacturing a hydrogen-absorbing alloy electrode according to claim 1, wherein said dissolving step is conducted so as to increase a surface area and removing oxide.

* * * * *